United States Patent [19]

Goke et al.

[11] Patent Number: 4,698,802

[45] Date of Patent: Oct. 6, 1987

[54] COMBINED CIRCUIT AND PACKET SWITCHING SYSTEM

[75] Inventors: Louis R. Goke, Austin, Tex.; Gary J. Grimes, Thornton, Colo.

[73] Assignee: American Telephone and Telegraph Company and AT&T Information Systems Inc., Holmdel, N.J.

[21] Appl. No.: 837,473

[22] Filed: Mar. 7, 1986

[51] Int. Cl.⁴ .................... H04Q 11/04; H04J 3/02; H04J 3/24

[52] U.S. Cl. ..................................... 370/60; 370/85; 370/94

[58] Field of Search .................. 370/60, 94, 85, 89, 370/104; 340/825.5

[56] References Cited

U.S. PATENT DOCUMENTS

| | | | |
|---|---|---|---|
| 3,708,625 | 1/1973 | Angeleri et al. | 179/15 BY |
| 3,920,920 | 11/1975 | Lager et al. | 179/15 BY |
| 3,922,497 | 11/1975 | Artom et al. | 179/15 AQ |
| 3,988,545 | 10/1976 | Kuemmerle et al. | 179/15 BV |
| 4,154,983 | 5/1979 | Pedersen | 370/89 |
| 4,313,197 | 1/1982 | Maxemchuk | 370/111 |
| 4,476,559 | 10/1984 | Brolin et al. | 370/110.1 |
| 4,528,659 | 7/1985 | Jones, Jr. | 370/80 |
| 4,535,448 | 8/1985 | Baxter et al. | 370/94 |
| 4,539,676 | 9/1985 | Lucas | 370/94 |
| 4,569,041 | 2/1986 | Takeuchi et al. | 370/94 |

Primary Examiner—Douglas W. Olms
Assistant Examiner—Frank M. Scutch, III
Attorney, Agent, or Firm—Donald M. Duft

[57] ABSTRACT

Apparatus for and a method of inserting circuit switch information and packetized data into different time slots of a time division multiplexed bus. A memory having a location individual to each time slot is written with information specifying whether the time slot individual to each location is to serve the circuit switch information or the packet data. The readout of each memory location during the occurrence of it's associated time slot controllably effects the application of either the circuit switch information or the packet data to the bus.

23 Claims, 6 Drawing Figures

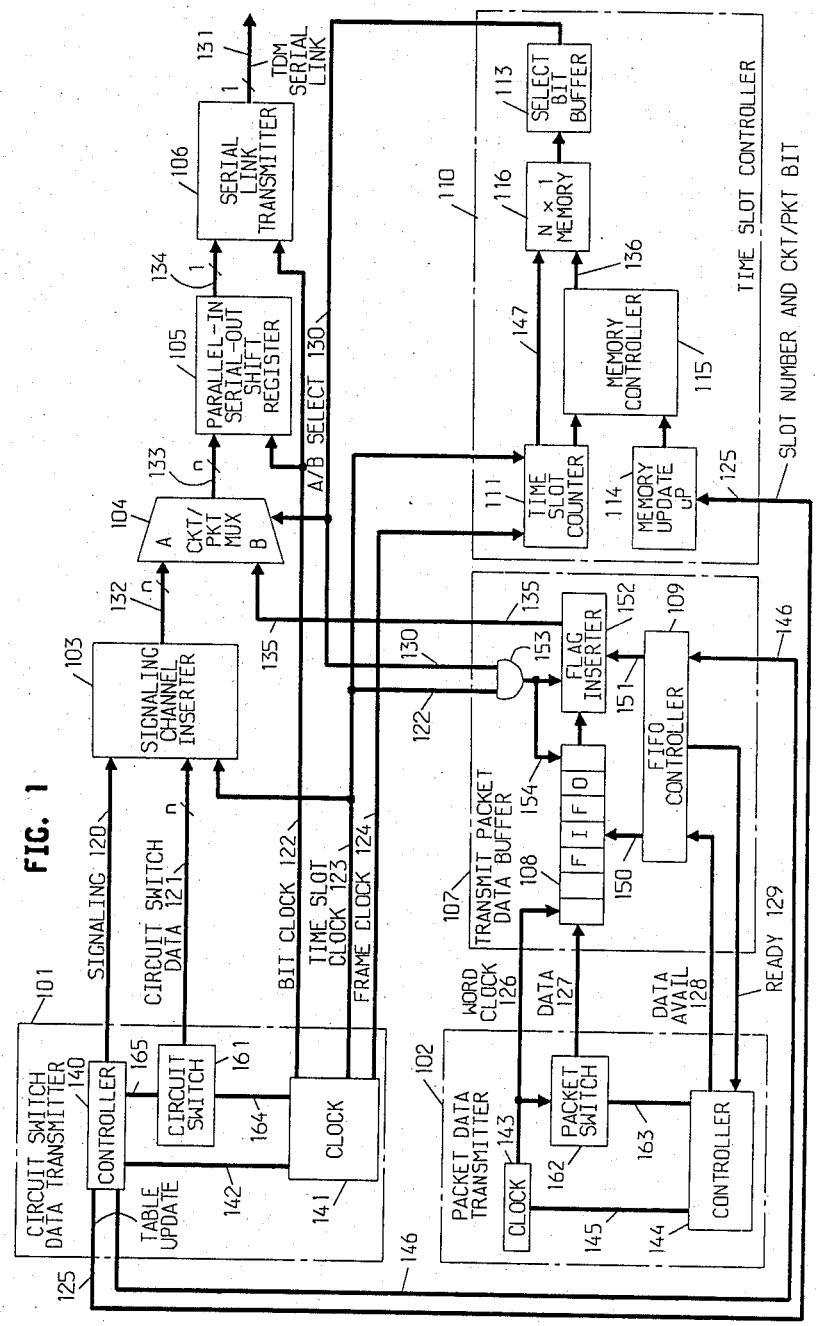

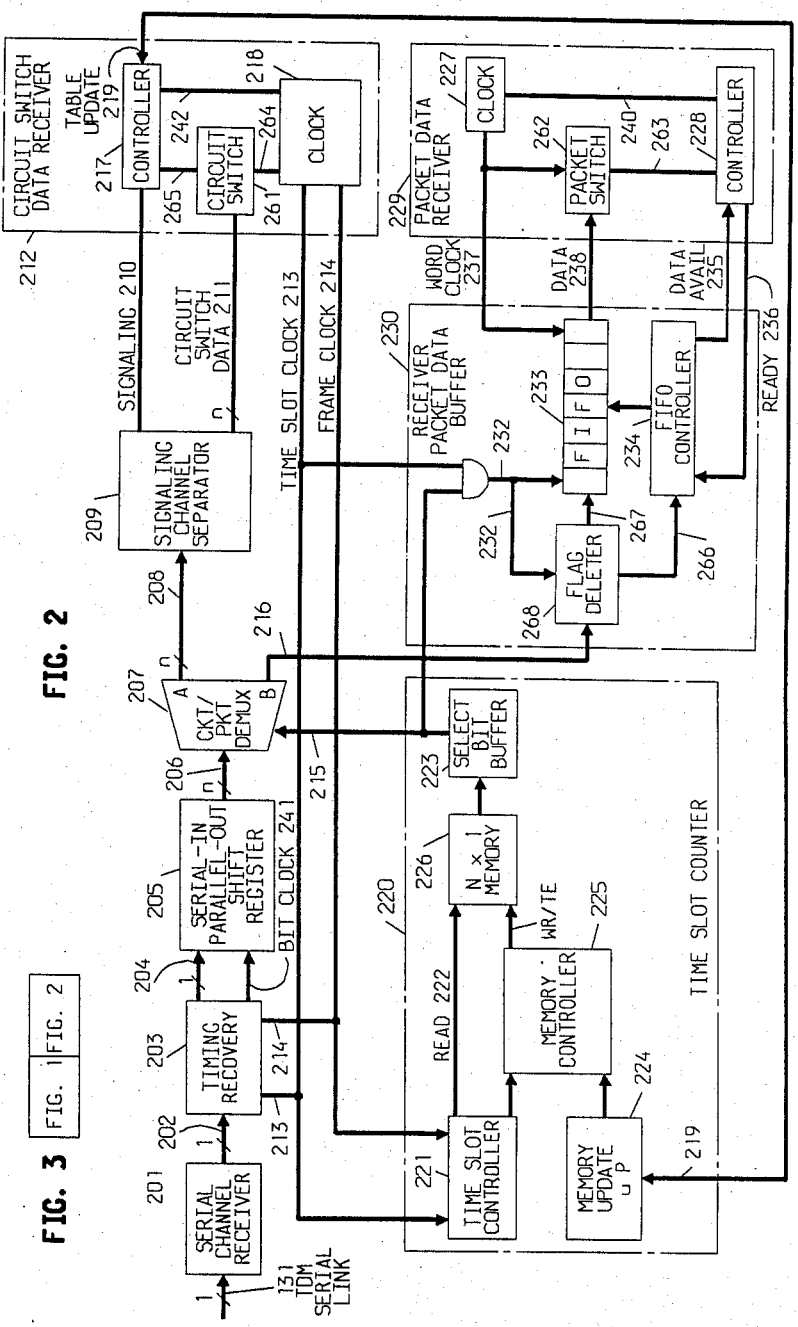

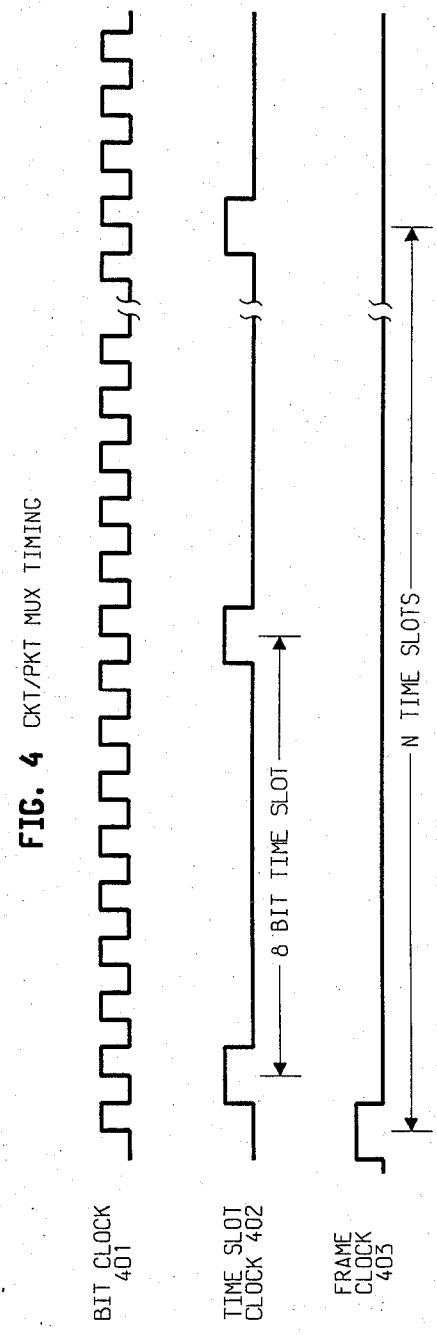
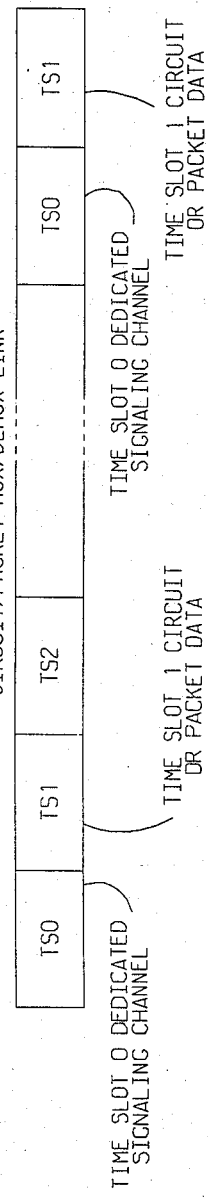

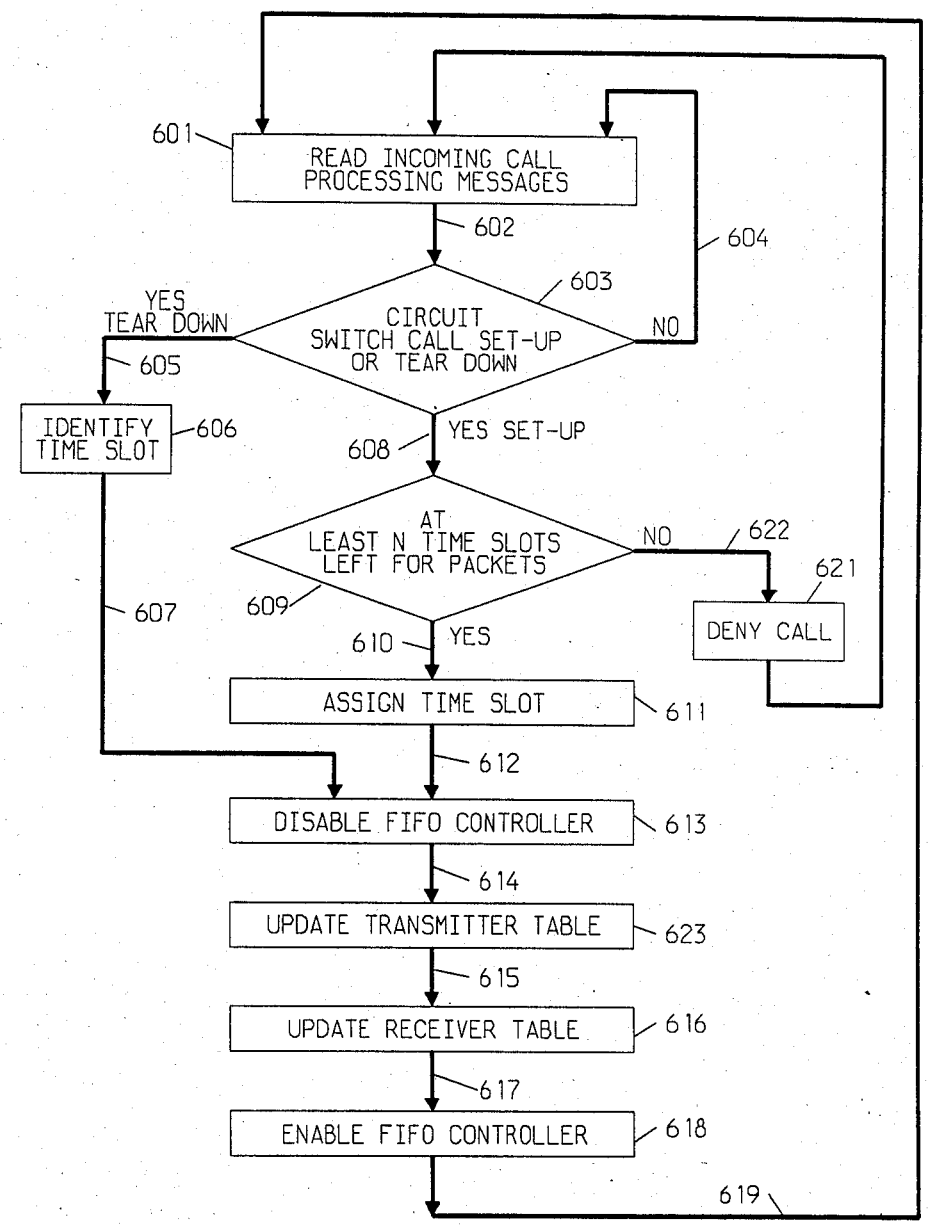

COMBINED CIRCUIT AND PACKET SWITCHING SYSTEM

TECHNICAL FIELD

This invention relates to apparatus for transmitting different types of information over a common transmission path from a first to a second location. More particularly, this invention relates to facilities for transmitting both circuit switch and packet information over a common time division multiplexed transmission path.

PROBLEM

There are circumstances under which it is desirable to transmit both circuit switch information and packet data from a first to a second location. Obviously, separate transmission facilities could be used with each facility being distinct and operating independently of the other. This however would be an unwise choice in view of the cost of the duplicated facilities.

It is known to use a single time division multiplexed (TDM) transmission path for transmitting both circuit switch information and packet data from a first to a second location. The circuit switched information is transmitted in certain assigned time slots of the TDM path and the packet data is transmitted in the time slots not currently being used by the circuit switch information. A problem exists with regard to the currently available arrangements for assigning time slots to the serving of the two types of traffic. Obviously, a fixed assignment arrangement could be used wherein each type of information is permanently assigned to certain time slots. For example, the circuit switch information could be assigned to 90% of the time slots and the packet data assigned to the remaining 10%. Fixed assignments are undesirable since they make no provision for the different levels of traffic that may exist at different times. For example, with fixed assignment there could be idle time slots assigned to the circuit switch information during times when all the time slots assigned to the packet information are busy and there is a backlog of packet data waiting to be transmitted.

It is therefore desirable to operate systems of this type using a dynamic time slot assignment mechanism which provides for flexibility in assigning the two different types of traffic to time slots. Such an arrangement should dynamically take into account the current level of traffic for each type of information so that all time slots are used efficiently.

A dynamic control arrangement of this type is shown in U.S. Pat. No. 3,988,545 to Karl A. Kuemmerle et al of Oct. 26, 1976. Kuemmerle discloses a method using a TDM multiplexer by which circuit switch snychronous data and packet switch asynchronous data are combined for transmission over a common TDM channel. Time slots of variable widths are assigned to the circuit switch traffic and the remaining capacity of the TDM frame is used for the transmission of the packet data which is inserted into the gaps between the assigned time slots in the form of an intermittent bit stream. The majority of the time slots are assigned to the circuit switch traffic and the packet data is transmitted only during occurrences of those time slots not currently being used by the circuit traffic. A minimum number of time slots, say n for example, are always available in Keummerle for the transmission of packet data. The number n can grow when the circuit switch does not use all of the time slots to which it is entitled.

Kuemmerle's control circuitry looks at successive TDM frames to determine the availability of contiguous idle time slots to handle the packet data. He attempts to identify the current availability of enough idle contiguous times slots to accommodate, on a packet by packet basis, the various sizes of packets waiting to be transmitted. Thus, if a large packet is waiting to be transmitted, Kuemmerle attempts to find sufficient contiguous idle time slots to transmit the entirety of this large packet. Kuemmerle's control circuitry attempts to transmit all packets in this manner and takes into consideration the size of the packet to be transmitted and the availability of idle contiguous times slots. However, if a sufficient number of contiguous idle time slots are not available to transmit a waiting packet, Keummerle's control circuitry, as a last resort, breaks up the packet and transmits it in whatever idle time slots are currently available for packet transmission.

While the Kuemmerle's circuitry appears to be adequate to perform its intended function, his control circuitry is unduly complicated since it requires an analysis of several successive frames to determine which time slots are currently idle as well as an analysis of patterns of contiguous idle time slots. The Keummerle control circuitry is further complicated by the fact that it attempts to transmit waiting packets in identified idle contiguous time slots.

SOLUTION

The present invention overcomes the above described problems and deficiencies of the prior art and a technical advance is achieved by the provision of improved apparatus, including improved control facilities, for transmitting circuit switch and packet data from a first to a second location over a single TDM transmission path. The control facilities normally give the circuit switch information preference in the use of time slots. However, the packet data is assigned a certain minimum number of times slots so that there never is a total blockage of the transmission of packet data during times of heavy circuits switch traffic. The control facilities are dynamic in their operation in that they permit the packet data traffic the use of all time slots not currently being used by the circuit switch traffic. Further, the packet channel created uses all available time slots for the transmission of each packet so that packet transmission time is minimized.

The control facilities provide an improvement over the prior art arrangements in that an analysis of successive TDM frames and the time slots patterns of these frames is not required for the controller to assign packet traffic to idle time slots. Another advantage is that the controller is not required to determine the size of a packet waiting to be transmitted and then, find a sufficient number of contiguous idle time slots to accommodate this packet. The controller of the invention is unconcerned with the size of a packet waiting to be transmitted. It operates on an instantaneous basis, determines the current availability of an idle time slot and then transmits one byte of a waiting packet over the TDM bus during that time slot to the distant location. The waiting packet is thereby transmitted byte by byte in available successive idle time slots that are currently not being used by the circuit traffic.

In greater detail, a time slot driven multiplexer having two inputs is provided at the transmitting end. One input of the multiplexer receives circuit switch information. The other input receives the packet data waiting to be transmitted. The operative state of the multiplexer is instantaneously controlled on a time slot basis by an n by 1 memory where n equals the number of time slots on the TDM path. The memory advances from position to position on a time slot driven basis and the current contents of each memory position i.e. a 0 or a 1, causes the multiplexer to either activate its circuit switch input or its packet data input. For example, assume a 0 in a memory location activates the circuit switch input of the multiplexer while a 1 activates the packet data input. With this arrangement, circuit switch information is transmitted over the bus during a particular time slot if a 0 is read out of the memory location associated with the time slot. Conversely, packet data is transmitted during a particular time slot if a 1 is currently read out of the associated memory location.

A packet buffer having a first in first out (FIFO) memory stores the packet data waiting to be transmitted. This FIFO memory is byte oriented in that each location of the memory stores a single n bit byte. A plurality of such bytes make up a packet and a packet may have either a fixed or a variable number of bytes. The output of the FIFO is connected to the input of the demultiplexer that serves the packet information.

The n by 1 memory is time slot driven and, at any instant of time, it reads out either a 0 or a 1 which is applied to the control input of the multiplexer to activate either the circuit switch or the packet data input of the multiplexer. The circuit switch input is activated by the reception of a 0 and circuit switch information is then transmitted over the TDM path to the distant location. The packet data input of the multiplexer is activated by the reception of a 1 by the control input and, at that time, one byte is then read out of the FIFO, applied to the packet input of the multiplexer, and transmitted during the current time slot via the TDM path to the distant location. The next byte in the FIFO is read out immediately upon the availability of another idle time slot—as indicated by a 1 in the n by 1 memory location associated with the other time slot. In other words, the first byte in the FIFO is read out as a consequence of a 1 being stored in the memory location associated with the current time slot. The 1 in the memory is read out and applied to the control input of the multiplexer which activates its packet data input. The next byte in the FIFO is transmitted during the next idle time slot as indicated by a 1 in its associated memory location. This time slot may or may not be contiguous to the time slot in which the first byte is transmitted.

The packet information in the FIFO is transmitted in this manner with each byte being transmitted immediately upon the availability of an idle time slot as indicated by the storage of a 1 in the memory n by 1 memory location associated with the time slot. In this manner, a packet of y bytes is transmitted during the occurence of the first y time slots that are not currently being used for circuit switch information. It is irrelevant and immaterial whether these y time slots are contiguous.

The above described control arrangement is advantageous for a number of reasons. First of all, it does not required complicated control facilities for analyzing a number of successive TDM frames to determine patterns and locations of idle time slots currently available for packet transmission. Secondly, it does not require the controller to determine the size of a packet waiting to be transmitted nor does it require the controller to find a number of contiguous idle time slots that can accommodate a packet of this size. Instead, the controller of the present invention only has to identify idle time slots and to insert one byte of a waiting packet into an idle time slot as it becomes available.

The receiving end circuitry of the invention includes control circuitry which keeps track of which time slots are assigned to circuit switch traffic and which are assigned to packet traffic. It further includes a demultiplexer which steers each received time slot either to the circuit switch receiving facilities or the packet data receiving facilities. The packet data receiving facilities include a FIFO which receives the transmitted packet bytes and makes them available to a packet switch at the receiving end.

One time slot of the TDM path is permanently reserved for signaling between the transmitting and receiving locations. This time slot is used to send messages from the transmitter to the receiver to advise the receiver as to which time slots are assigned to each type of traffic.

BRIEF DESCRIPTION OF THE DRAWINGS

These and other advantages of the invention may be better understood from a reading of the following description taken in conjunction with the drawings in which:

FIGS. 1 and 2, when arranged as shown in FIG. 3, disclose one possible exemplary embodiment of the invention;

FIG. 4 is a timing diagram;

FIG. 5 discloses further details regarding the assignment of time slots on the TDM bus; and FIG. 6 discloses further information regarding the assignment of time slots to the two different types of traffic served by the system of FIGS. 1 and 2.

DETAILED DESCRIPTION

FIGS. 1 and 2, when arranged is shown on FIG. 3 disclose the circuit details of one possible exemplary embodiment of the invention. The left side of FIG. 1 includes a circuit switch data transmitter 101 having a circuit switch 161 and a packet data transmitter 102 having a packet switch 162. The right side of FIG. 2 includes a circuit switch data receiver 212 having a circuit switch 261 and a packet data receiver 229 having a packet swtich 262. A TDM serial link 131 interconnects the ride side of FIG. 1 with the left side of FIG. 2. The remainder of the circuitry on FIG. 1 enables information from circuit switch 161 and data from packet switch 162 to be applied over the time slots of TDM link 131 to the circuitry of FIG. 2. The circuitry of FIG. 2 receives the TDM signals and applies the contents of each received time slot to either circuit switch data receiver 212 or to packet data receiver 229.

The A input of multiplexer 104 on FIG. 1 receives the circuit switch information. Input B of multiplexer 104 receives the packet data. Conductor 130 controls multiplexer 104 and determines which input of the multiplexer is to be active and connected signal-wise to its output on path 133. The input that is active during a time slot is the input that supplies the information that is transmitted over TDM link 131 to the circuitry of FIG. 2.

Circuit switch 161 may comprise a PBX, a Central Office or any other type of device that generates Pulse Coded Modulation (PCM) time slot signals. The time slot signals from circuit switch 161 are extended over path 121 to signaling channel inserter 103. Path 121 is n bits wide to accommodate the number of PCM bits generated during each time slot. Eight bits is a commonly used number and conductor 121 may therefore be eight bits or eight conductors wide. The signals on path 121 are extended through inserter 103 to conductor 132 which is also n bits wide.

Inserter 103 also receives signals on path 120 and inserts these into a permanently assigned time slot of the PCM stream for transmission to the circuitry of FIG. 2. Time slot 0 is permanently reserved to serve the signals generated by controller 140 and applied to path 120. The signals applied to path 120 and transmitted in time slot 0 are messages advising the circuitry of FIG. 2 which time slots are currently assigned to circuit switch service and which are assigned to packet service. The time slot signals on path 132 therefore include in time slot 0 the signals on path 120 and in the remainder of its time slots include the circuit switch information on path 121. The time slot signal stream on path 132 is applied to input A of multiplexer 104 and when this input of multiplexer is active, the signals on path 132 are extended through the multiplexer and over path 133 to the parallel in serial out shift register 105. The output of register 104 is a one bit wide serial signal which is applied via serial link transmitter 106 to TDM link 131 for transmission to the circuitry of FIG. 2.

Packet switch 162 generates the packet data that is to be transmitted over the TDM serial link to the receiver circuitry of FIG. 2. Packet data transmitter 102 includes clock 143 which is asychronous with respect to clock 141 of circuit switch transmitter 101. Transmitter 102 further includes controller 144 which controls the overall operation of transmitter 102 and, by path 145, controls the operation of clock 143. Controller 144 applies a high signal over path 128 to FIFO controller 109 of transmit packet data buffer 107 when data packet switch 162 has data available for transmission to the circuitry of FIG. 2. Packet switch 162 advises controller 144 of this availability via path 163. Controller 109 responds via path 129 with a high signal when data buffer 107 is ready to receive packet data from transmitter 102. Controller 144 then applies a high signal to path 145 to activate clock 143. Clock 143 responds and applies a clock signal over path 126. Packet switch 162 in turn applies data over path 127 to FIFO 108 in response to the clock signals on path 126. FIFO 108 is thereby loaded with packet information from transmitter 102 under control of the clock signals on path 126. Path 127 is n bits wide and thus an n bit word or byte is written in FIFO 108 in response to each clock pulse applied to FIFO 108 over path 126.

FIFO 108 is read out under control of time slot clock signals on path 123. These signals are applied to the left input of AND GATE 153 with the right input of the AND GATE being path 130 which is a high (a 1) only when the current time slot is assigned to the serving of packet data. At such times, the time slot clock pulse on path 123 is passed through AND GATE 153 and applied to FIFO 108 to read it out. The information read out of FIFO 108 is applied through flag inserter 152 and over path 135 to the B input of multiplexer 104. The flag inserter 152 operates under control of controller 109 in such a manner that it acts merely as a conduit for the information read out of FIFO 108 when the FIFO contains information to be read out. Once the FIFO is read out and contains no further information, controller 109 activates the flag inserter 152 by path 151 so that a flag is generated, and applied over path 135 to the B input of multiplexer 104 for each time slot for which there is no information in FIFO 108. At such times, a flag character is transmitted over the TDM link 131 rather than packet data from FIFO 108.

Time slot controller 110 keeps track of which time slots are currently assigned to circuit switch transmission and which time slots are currently available for the transmission of packet data. Time slot controller 110 includes time slot counter 111, memory update microprocessor 114, memory controller 115, an n by 1 memory 116 and select bit buffer 113.

Time slot counter 111 receives frame clock signals on lead 124 and the time slot clock signals on path 123. Counter 111 responds to the frame clock and time slot clock signals, and generates read address and read strobe signals. It applies these signals over path 147 to the n by 1 memory 116. These signals cause the locations of memory 116 to be read out sequentially as time slot counter 111 advances in response to the time slot clock signals.

Each location of memory 116 is unique to a different one of the system time slots and each memory location is read out when the time slot with which it is associated is currently active. Each location of memory 116 stores a binary 1 when the time slot is currently available for the transmission of packet data and stores a binary 0 when the time slot is currently assigned to the transmission of circuit switch information.

The read out contents of memory 116 are applied via select bit buffer 113 and over path 130 to the select lead 130 of multiplexer 104 to activate its A input when a 0 is applied to lead 130 and to activate its B input when a 1 is applied to lead 130.

In summary, memory 116 is sequentially read out, time slot by time slot, under control of signals on paths 123 and 124 from transmitter 101. The read out information is applied to buffer 113 and, from there, is applied to lead 130 to activate either the A or the B input of multiplexer 104 during each occurrence of each time slot. The determination of which input of multiplexer 104 is active is under control of a 1 on conductor 130 for packet service via the B input and a 0 on lead 130 for the activation of input A for circuit switched service.

Memory update microprocessor 114 and memory controller 115 together control the writing of new information in memory 116. New information must be written into memory 116 whenever the status of a time slot changes. Controller 140 of circuit switch transmitter 101 keeps track of which time slots are currently being used by the circuit switch and applies information over path 125 to microprocessor 114 commanding it to perform a memory write operation whenever the status of a time slot is to be changed. For example, if a particular time slot is currently being used for packet service, it has a binary 1 stored in its associated location of memory 116. Now, if that time slot is to be used for the transmission of circuit switch information, controller 140 transmits a message over path 125 to microprocessor 114 commanding it to write a 0 in the location of memory 116 associated with this particular time slot. Microprocessor 114 receives this information and applies signals to controller 115 commanding it to perform this write operation. Memory controller 115 receives time slot signals and other timing signals from counter 111 and, at the appropriate time, applies address information and a write strobe signal over path 136 to memory 116 to write a binary 0 in the associated memory location so that, from now on, the time slot associated with this memory location will be available for circuit switch information.

The signals applied to microprocessor 114 are in the appropriate format, such as HDLC, with each HDLC frame having a time slot field as well as a field indicating whether the time slot identified in the time slot field is to be written with a binary 1 or a 0. The microprocessor 114 receives these signals over path 125 and responds in the conventional manner and generates an acknowledgement which is transmitted back over path 125 to controller 140.

In summary of the description so far, multiplexer 104 is controlled by path 130 which is time slot driven and which receives a 0 during a particular time slot to activate the A input of the multiplexer if the system is serving circuit switch data during that time slot. Alternatively, path 130 receives a 1 to activate the B input of multiplexer 104 for the time slot duration if the time slot is serving packet data. The output of multiplexer 104 is applied over path 133 to the parallel in serial out shift register 105 which converts the received information from n bit parallel to 1 bit serial. The output of register 105 is applied over path 134 to serial link transmitter 106 which receives the serial signal on path 134 and applies it to the TDM serial link 131 for transmission to the circuitry of FIG. 2.

The serial signal received by the circuitry of FIG. 2 on path 131 is applied to serial channel receiver 201 and over path 202 to timing recovery element 203. The time slot clock signal embedded in the received signal is derived by element 203 and applied to path 213. The embedded frame clock signal is derived and applied to path 214. The embedded bit clock signal is derived and applied to path 241. The signal on path 202 is also extended through element 203 and out over path 204 to serial-in parallel-out shift register 205. This register converts the received information from a serial to an n bit wide parallel format and extends it over path 206 to the input of demultiplexer 207. The operative position of demultiplexer 207 is controlled by a 0 or 1 on path 215 in such a manner that the time slots containing circuit switch information are applied from output A of demultiplexer 207 and over path 208 to signaling channel separator 209. The time slots containing packet information are applied to the B output and over path 216 to the input of FIFO 233 which is part of receive packet data buffer 230.

The circuit switch information is separated by signaling channel separator 209 into the signaling information transmitted during time slot 0 switch information which is transmitted during each occurrence of the time slots currently assigned to the serving of circuit switch information. The signaling information transmitted during time slot 0 is applied over path 210 to controller 217 within circuit switch data receiver 212. The remainder of the circuit switch information is applied over path 211 to circuit switch 261. Circuit switch 261 is similar to circuit switch 161 in that it may be a PBX, a Central Office or any other type of circuit switch. Circuit switch data receiver 212 includes clock 218 which receives time slot clock signals and frame clock signals on paths 213 and 214, respectfully. In response to the receipt of these signals clock 218 generates the timing signals required for the operation of circuit switch data reciever 212 and circuit switch 261.

Controller 217 receives HDLC type message over path 210 during the occurrence of time slot 0 from the transmitter 101. These messages keep circuit switch receiver 212 advised as to which system time slots are currently assigned to the serving of circuit switch information and which are assigned to serving packet switch information. Controller 217 receives this information on path 210 and applies HDLC type messages over path 219 to time slot controller 220 to keep it updated with the latest time slot assignment information. Time slot controller 220 is similar in every respect to time slot controller 110 and its function is to apply signals to path 215 during each occurrence of each time slot so that the input information received by demultiplexer 207 is applied to one of its outputs A or B depending upon whether each such time slot is currently assigned to the serving of circuit switch information or packet data, respectfully. Since time slot controller 220 is similar in every respect to time slot controller 110, the function of the time slot counter 221 is similar to that already described for time slot counter 111; the function of memory update microprocessor 224 is similar to that already described for microprocessor 114; the function of memory controller 225 is similar to that already described for controller 115; the function of the n by 1 bit memory 226 is similar to that already described for memory 116 and the function of select bit buffer 223 is similar to that already described for element 113. The n by 1 bit memory 226 stores the latest time slot assignment information and applies it through select bit buffer 223 and out over path 215 to control the operation of demultiplexer 207 so that it steers the information contained in each time slot on path 206 to the correct one of its outputs A or B depending upon the type of service to which the time slot is currently assigned.

The packet switch data received by output B of the demultiplexer is extended over path 216 and via flag deleter 268 to the input of FIFO 233. Deleter 268 prevents any flag signals on path 216 from being applied to FIFO 233. This information on path 216 is read into the FIFO, word by word, during each time slot assigned to packet service under control of AND GATE 231 and its output path 232. The left hand input of AND GATE 231 is connected to path 215 which is high (a 1) only when a packet data is being served by the current system time slot. The right hand input and AND GATE 231 receives time slot clock signals on path 213. These time slot clock signals pass through AND GATE 231 only when packet data is being served by the current time slot and, at such times, the information on path 216 is read, word by word, time slot by time slot, into FIFO 233 via deleter 268.

FIFO controller 234 controls the operation of FIFO 233 so that the information in FIFO 233 is read out and applied to packet data switch 262 only during conditions acceptable to receiver 229. FIFO controller 234 applies a signal over path 235 to Controller 228 whenever FIFO 233 contains information. Controller 228 receives this signal and applies a reply signal to path 236 when receiver 229 and packet switch 262 is ready to receive information from FIFO 233. At such times, a signal is also extended over path 240 to clock 227 within receiver 229. This signal on path 240 causes clock signals to be applied once each time slot over path 237 to FIFO 233 to read it out, byte by byte, during each time slot. The read out information is extended over path 238 to receiver 229 and packet switch 262.

Receiver 229 and packet switch 262 receive packet information on path 238, byte by byte, once during each occurrence of each time slot assigned to the serving of packet data. These received bytes are stored, reformed into packets by packet switch 262 and extended to the destination specified by the address portion of the packet.

FIG. 4 is a timing diagram portraying the details of and the relationship between bit clock signals on line 401, time slot clock signals on line 402 and frame clock signals on line 403. A single time slot on line 402 comprise 8 bits of line 401.

FIG. 5 portrays a plurality of time slots and shows how time slot 0 is dedicated to serving the signaling channel information generated by the circuit switch data transmitter 101 and applied by it to path 120. This signaling information is inserted by inserter 103 into the PCM stream on path 132 during each occurrence of time slot 0 and extended through elements 104, 105 and 106 to the TDM serial link 131. From there, it is received by the circuitry of FIG. 2 and extended through elements 201, 203, 205, 207 and 209. Element 209 separates the time slot 0 information from that of the other time slots and applies it to signaling path 210 over which it is applied to circuit switch receiver 212 and controller 217. FIG. 5 also shows how the remaining time slots, those that are not time slot 0, may be used for the serving of either circuit switch or packet data.

FIG. 6 discloses the method by which the controller 140 allocates time slots to serve the circuit switch information and packet data. This allocation is on a dynamic basis and is performed in such a manner that a certain minimum number of time slots are always made available for the serving of packet data. The remainder are available for the serving of either packet data or circuit switch information. During times of heavy traffic, the circuit switch information has preference except for the few time slots that are reserved and always left available for serving packet information. The manner in which this function is performed is described in the following paragraphs.

Element 601 reads the various incoming call processing messages within circuit switch 161 to identify those concerned with the setup or take down of a circuit switch call. Each message is extended over a path 602 to decision element 603. If the message does not pertain to the setup or take down of a call, the process returns over path 604 to element 601. If the message pertains to the setup of a call, it is extended over path 608 to decision element 609 which determines whether n time slots would still be available for the serving of packet information if a time slot is assigned to this new service request. If n time slots would not be left available, then a signal is sent over path 622 to element 621 which denies the call request and the process returns over path 620 to element 601. On the other hand, if at least n time slots would still be available for packet service, the process extends over path 610 to element 611 which assigns an idle time slot to the call associated with the current service request. The process then extends over path 612 to element 613 which disables the FIFO controller 109 so that FIFO 108 cannot read out any information during the next occurrence of the newly assigned time slot. The process then extends over path 614 to element 623 which causes the n by one memory 116 to be updated with new information indicating that a time slot has been assigned to the serving of this call within circuit switch 161. Element 623 causes a HDLC type message to be sent over path 125 to memory update microprocessor 114 so that the n by one bit memory 116 is updated with new information.

The process then extends over path 615 to element 616 which causes an HDLC type signaling message to be applied over path 120 and the signaling channel time slot 0 to the circuitry of FIG. 2 to update the n by one memory 226 with information indicating that this time slot is now assigned to the serving of circuit switch data. The process then extends over path 617 to element 618 which enables or reactivates the FIFO controller 109 over path 146 so that FIFO 108 may resume its activity of applying packet information, word by word, to input B of multiplexer 104 during each occurrence of a time slot that is not currently serving circuit switch information.

With respect to element 603, if the received message requires the tear down of a circuit switch call, the process extends over paths 605 to element 606 which identifies the time slot currently assigned to the serving of the call that is to be torn down. The process then extends over path 607 to element 613 which disables the FIFO controller 109 over path 146 while memory 116 is updated and written with new information indicating that a time slot that was priorly serving circuits switched information is now available for the serving of packet data.

The process continues to element 623 which causes memory 116 to be updated with new information. Element 616 causes an HDLC type signaling message to be sent to the receiver of FIG. 2 so that it updates its n by 1 bit memory 226 with the new time slot information. Element 618 reenables FIFO Controller 109 so that FIFO 108 can resume transmission of packet data during idle time slots. The process extends from element 618 and out over path 619 back to element 601 to await the receipt of the next call processing message.

There been described the circuitry and method of the present invention which provides for the improved and simplified control of combined circuit switch and packet switch facilities wherein the types of information generated by each such facility may be extended over a common TDM link 131 from a transmitting location to a receiving location. The control operates in a simple and effective manner that permits each and every idle time slot not currently associated with the serving of circuit switch data to be made available for the serving of packet switch data. Packet switch data is thereby rapidly transmitted over the TDM link immediately upon each occurrence of an idle time slot. The control facilities are simplified and do not require the complexities associated with an analysis of a plurality of frames to determine which time slots are idle and which are busy. They also do not require an analysis to determine the availability of adjacent idle time slots for the transmission of entire packets. Instead, the control is accomplished by the n bit wide memory 116 which controls the multiplexing facilities 104 so that circuit switch information is transmitted during each occurrence of each time slot assigned to serving circuit switch information and so that packet information may be transmitted during each occurrence of each time slot not currently assigned to serving circuit switch information.

The packets to be transmitted are broken up into words and stored in a word by word basis in transmitting FIFO 108. They are then read out of the FIFO 108 during each occurrence of each idle time slot and transmitted to the receiving facilities of FIG. 2 via TDM path 131. The receiving facilities perform the function of applying the information recieved in time slots associated with circuit switched information to circuit switch 261. The time slots containing packet data are applied to the packets facilities which receive a word of packet information during each such idle time slot. They store the received information in receive FIFO 233 on a word by word basis. The received words are then applied to the packet switch 262 which reassembles the received words into the original packets from whence the words came.

While a specific embodiment of the invention has been disclosed, variations within the scope of the appended claims are possible and are contemplated. There is no intention of limitation to what is contained in the abstract or the exact disclosure as herein presented. The above-described arrangements are only illustrative of the application of the principles of the invention. It is to be expected that other arrangements will be devised by those skilled in the art without departing from the spirit and the scope of the invention.

The below indicated elements in the preceding description may be embodied by the below indicated commercially available parts:

Memory Controller—Intel 8207
FIFO Controller—Signetics 8X60
Microprocessor—Intel 8051
Ckt/Pkt MUX-Texas Instruments 74152
Ckt/Pkt DEMU-Texas Instruments 74156
Time Slot Counter-Texas Instruments 74163
Parallel-In Serial Out Shift Register-Texas Instruments 74166
Serial-In Parallel Out Shift Register-Texas Instruments 74164

What is claimed is:

1. Apparatus for transmitting a first and a second type of information over a time slot driven bus, characterized in that said apparatus comprises:

a memory having a location individual to each time slot on said bus, means for writing an indication in each memory location specifying whether the time slot individual to each said location is currently assigned to serve said first or second type of information, and means responsive to each occurrence of each of said time slots on said bus for inserting into said each said time slot the type of information specified by the current contents of the memory location individual to each said time slot.

2. The apparatus of claim 1 in combination with receiving apparatus for receiving said first and said second type of information transmitted over said time slot driven bus, said receiving apparatus comprising:

a receiving memory having a location individual to each time slot on said bus, means for writing an indication in each receiving memory location specifying whether the time slot individual to each said location is currently assigned to serve said first or second type of information, a first and a second means for receiving, respectively, said first and second types of information transmitted over said bus, and means controlled by said receiving memory during each occurrence of each of said time slots for applying the information received in each said time slot to either said first or second receiving means under control of the current contents of the memory location individual to each said time slot.

3. The apparatus of claim 1 or claim 2 wherein said first type of information comprises circuit switch information and wherein said second type of information comprises packetized data.

4. The apparatus of claim 1 in combination with:

means for inserting message information into successive occurrences of one of said time slots with said message information specifying which of said time slots are to serve said first type of information and which of said time slots are to serve said second type of information.

5. The apparatus of claim 2 in combination with:

means for inserting message information into successive occurrences of one of said time slots with said message information specifying which of said time slots are to serve said first type of information and which of said time slots are to serve said second type of information, means in said receiving apparatus for receiving said message information, and means responsive to the receipt of said message information for writing into said receiving memory information specifying the type of information that is to be served by each of said time slots by said receiving apparatus.

6. Apparatus for transmitting circuit switch information and packet information over a time slot driven bus, said apparatus comprising:

means for generating said circuit switch information, means for generating said packet information, a memory having a location individual to each time slot on said bus, means for writing an indication in each memory location specifying whether the time slot individual to each said location is currently assigned to serve said circuit switch information or said packet information, means responsive to each occurrence of each of said time slots for reading out the location of said memory individual to each said time slot, means responsive to said readout during each occurrence of a time slot assigned to serve circuit switch information for applying said circuit switch information to said bus, and means responsive to said readout during each occurrence of a time slot not assigned to serve said circuit switch information for applying packet information to said bus.

7. The apparatus of claim 6 in combination with receiving apparatus for receiving said circuit switch and said packet information transmitted over said time slot driven bus, said receiving apparatus comprising:

a receiving memory having a location individual to each time slot on said bus, means for writing an indication in each receiving memory location specifying whether the time slot individual to each said location is currently assigned to serve said circuit switch or said packet information, circuit switch means and packet means for receiving, respectively, said circuit switch information and said packet information transmitted over said bus, and means controlled by said receiving memory during each occurrence of each of said time slots for applying the information received in each said time slot to either said circuit switch or said packet receiving means under control of the current contents of the memory location individual to each said time slot.

8. The apparatus of claim 7 in combination with:

means for inserting message information into successive occurrences of one of said time slots with said messge information specifying which of said time slots are to serve said circuit switch information and which of said time slots are to serve said packet information, means in said receiving apparatus for receiving said message information, and means responsive to the receipt of said message information for writing into said receiving memory indicia specifying the type of information that is to be served by each of said time slots by said receiving apparatus.

9. Apparatus for transmitting circuit switch information and packet information over a time slot driven bus, said apparatus comprising:

a memory having a location individual to each time slot on said bus, means for writing an indication in each memory location specifying whether the time slot individual to each said location is currently assigned to serve said circuit switch information or said packet information, multiplexer means having a first input and a second input, means for applying circuit switch information to said first input during each occurrence of a time slot currently assigned to serve said circuit switch information, means for applying packet information to said second input during each occurrence of a time slot not currently assigned to serve said circuit switch information, an output and a control input on said multiplexer, means effective during each occurrence of each of said time slots for reading out the contents of the memory location individual to each said time slot, means further effective during each said time slot for applying said read out contents to said control input of said multiplexer, said multiplexer being responsive to said application of said read out contents to its control input during each occurrence of each of said time slots to extend said information on either said first or second input to said output of said multiplexer depending upon whether said readout contents applied to said control input during each said time slot occurrence specify circuit switch information or packet information, and means for applying said information on said output to said time slot driven bus.

10. The apparatus of claim 9 in combination with receiving apparatus for receiving said circuit switch and said packet information transmitted over said time slot driven bus, said receiving apparatus comprising:

a receiving memory having a location individual to each time slot on said bus, means for writing an indication in each receiving memory location specifying whether the time slot individual to each said location is currently assigned to serve said circuit switch information or said packet information, a demultiplexer having an input and a first and second output and a control input, means for applying said information received over said bus to said input of said demultiplexer, means effective during each occurrence of each of said time slots for reading out the contents of said receiving memory location individual to each said time slot, means further effective during each occurrence of each of said time slots for applying said read out contents of said receiving memory to said control input of said demultiplexer, said multiplexer being responsive to said application of said readout contents of said control memory to said control input of said demultiplexer during each time slot occurrence to extend said information currently on said input of said demultiplexer to either said first or second output of said demultiplexer depending upon whether said applied contents readout during each said time slot specify circuit switch information or packet information, and a first and a second means for receiving, respectively, said circuit switch information and second packet information transmitted over said bus and applied to said first and second outputs, respectively, of said demultiplexer.

11. The apparatus of claim 10 in combination with:

means for inserting message information into successive occurrences of one of said time slots with said message information specifying which of said time slots are to serve said circuit switch information and which of said time slots are to serve said packet information, means in said receiving apparatus for receiving said message information, and means responsive to the receipt of said message information for writing into said receiving memory information specifying the type of information that is to be served by each of said time slots by said receiving apparatus.

12. A method of operating apparatus for transmitting a first and a second type of information over a time slot driven bus, said method comprising the steps of:

(1) operating a memory having a location individual to each time slot on said bus by writing an indication in each memory location specifying whether the time slot individual to each said location is currently assigned to serve said first or second type of information, and (2) inserting into said each said time slot on said bus the type of information specified by the current contents of the memory location individual to each said time slot.

13. The method of claim 12 in combination with the method of operating receiving apparatus for receiving said first and a second type of information transmitted over said time slot driven bus, said method of operating said receiving apparatus comprising the steps of:

(1) operating a receiving memory having a location individual to each time slot on said bus by writing an indication in each receiving memory location specifying whether the time slot individual to each said location is currently assigned to serve said first or second type of information, and (2) applying the information received in each said time slot to either a first or a second receiving means under control of the current contents of the receiving memory location individual to each said time slot.

14. The method of claim 12 or claim 13 wherein said first type of information comprises circuit switch information and wherein said second type of information comprises packetized data.

15. A method of operating apparatus for transmitting circuit switch and packet information over a time slot driven bus, said method comprising the steps of:
   (1) operating a memory having a location individual to each time slot on said bus by writing an indication in each memory location specifying whether the time slot individual to each said location is currently assigned to serve said circuit switch information or said packet information,
   (2) applying said circuit switch information to a first input of a multiplexer during each occurrence of a time slot currently assigned to serve said circuit switch information,
   (3) applying said packet information to a second input of said multiplexer during each occurrences of a time slot not currently assigned to serve said circuit switch information,
   (4) reading out the contents of the memory location individual to each said time slot during each occurrence of each of said time slots,
   (5) applying said read out contents to a control input of said multiplexer during each said time slot occurrence,
   (6) during each occurrence of each of said time slots, extending said signals on either said first or second input of said multiplexer to said output of said multiplexer under control of said read out contents applied to said control input of said multiplexer, and
   (7) applying said signals on said output to said time slot driven bus.

16. The method of claim 15 in combination with the method of operating receiving apparatus for receiving said circuit switch information and said packet information transmitted over said time slot driven bus, said method of operating said receiving apparatus comprising:
   (1) operating a receiving memory having a location individual to each time slot on said bus by writing an indication in each receiving memory location specifying whether the time slot individual to each said location is currently assigned to serve said circuit switch information or said packet information,
   (2) applying said information received over said bus to an input of a demultiplexer,
   (3) reading out the contents of the location of said receiving memory individual to each said time slot during each occurrence of each said time slot,
   (4) applying said readout contents of said receiving memory to a control input of said demultiplexer during each occurrence of each of said time slots,
   (5) extending said signals on said input of said demultiplexer to either a first or a second output of said demultiplexer depending upon whether said applied contents readout of said receiving memory during each said time slot represents circuit switch information or packet information,
   (6) applying said circuit switch information on said first output of said multiplexer to a receiving circuit switch, and
   (7) applying said packet information on said second output of said multiplexer to a packet switch.

17. The method of claim 16 in combination with the steps of:
   (1) inserting message information into successive occurrences of one of said time slots with said message information specifying which of said time slots are to serve said circuit switch information and which of said time slots are to serve said packet information,
   (2) receiving said message information within said receiving apparatus, and
   (3) responsive to the receipt of said message information, writing into said receiving memory information specifying the type of information that is to be served by each of said time slots by said receiving apparatus.

18. Apparatus for transmitting a first and a second type of information over a time slot driven bus, said apparatus comprising:
   a source of information of a first type for generating cyclically reoccurring frames of information with each of said frames comprising a plurality of time slots and with said first type of information being contained in certain ones of said time slots on said bus with the remainder of time slots being idle,
   means for storing information specifying which of said time slots currently contain said first type of information and which of said time slots are currently idle,
   a source of information of a second type, and
   means controlled by said storing means for transmitting said second type of information over said bus by inserting any currently extant information of said second type into any of said currently idle time slots so that all of said idle time slots are used to transmit any extant information of said second type.

19. The apparatus of claim 18 wherein said means controlled by said storing means comprises a multiplexor having a first input for receiving said first type of information and a second input for receiving said second type of information,
   an output on said multiplexor, and
   said storing means being effective controllably to connect said output to said first and second inputs, respectively, during occurrences of time slots serving said first and said second types of information, respectively.

20. The apparatus of claims 19 wherein said first type of information comprises circuit switch information and wherein said second type of information comprises packet switch information.

21. Apparatus for transmitting a circuit switch and packet information over a time slot driven bus, said apparatus comprising:
   a circuit switch information source for generating a time multiplexed signal comprising cyclically reoccurring frames of information with each of said frames comprising a plurality of time slots and with said circuit switch information being contained in only certain ones of said time slots with the remainder of said time slots being idle,
   means for storing information specifying which of said time slots currently contain said circuit switch information and which of said time slots are currently idle,
   a source of packet information and,
   means controlled by said storing means for transmitting said packet information over said bus by inserting any currently extant packet information into said currently idle time slots so that all of said idle time slots are used to transmit any extant packet information.

22. The apparatus of claim 21 wherein said means controlled by said storing means comprises a multiplexor having a first input for receiving said time slot multiplexed signal from said circuit switch and a second input for receiving said packet information, an output on said multiplexor connected to said bus, and said determining means being effective controllably to connect said output to said first and second inputs, respectively, during occurrences of time slots serving said first and said second types of information, respectively.

23. Apparatus for transmitting a first and a second type of information over a time slot driven bus, said apparatus comprising:

a source of information of a first type for generating a signal comprising cyclically reoccurring frames of information with each of said frames comprising a plurality of time slots and with said first type of information being contained in certain ones of said time slots on said bus with the remainder of said time slots being idle, a source of information of a second type, combining means, and means for controlling said combining means to transmit said first and said second type of information over said bus by inserting any currently extant information of said second type into any of said currently idle time slots so that all of said idle time slots are used to transmit any extant information of said second type.

* * * * *